(12) United States Patent
Levich et al.

(10) Patent No.: US 6,265,140 B1
(45) Date of Patent: *Jul. 24, 2001

(54) SILVER HALIDE MATERIAL FOR OPTICAL MEMORY DEVICES WITH LUMINESCENT READING AND METHODS FOR THE TREATMENT THEREOF

(75) Inventors: Eugene B. Levich, Tel-Aviv; Jacob N. Malkin; Mark A. Alperovich, both of Ashdod, all of (IL); Boris M. Shapiro, Moscow (RU)

(73) Assignee: TriDStore IP, LLC, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/028,932

(22) Filed: Feb. 24, 1998

Related U.S. Application Data

(60) Provisional application No. 60/038,918, filed on Feb. 24, 1997, now abandoned.

(51) Int. Cl.[7] .................................................. G03C 5/46
(52) U.S. Cl. .................. 430/370; 430/371; 430/945; 430/363; 430/270.11; 430/139
(58) Field of Search .................... 430/139, 370, 430/371, 367, 945, 270.11, 363

(56) References Cited

U.S. PATENT DOCUMENTS

| | | | |
|---|---|---|---|
| 1,059,917 | * | 4/1913 | Taugeingne ........................... 430/371 |
| 1,305,962 | * | 6/1919 | Crabtree ............................... 430/371 |
| 1,389,742 | * | 9/1921 | Crabtree ............................... 430/371 |
| 1,945,658 | * | 2/1934 | Roessler .............................. 430/371 |
| 1,956,122 | * | 4/1934 | Gaspar ................................. 430/371 |
| 2,308,023 | * | 1/1943 | Peterson .............................. 430/371 |
| 3,869,363 | | 3/1975 | Singh ................................... 430/139 |
| 4,090,031 | * | 5/1978 | Russell .............................. 346/135.1 |
| 4,299,904 | * | 11/1981 | Pettijohn et al. ..................... 430/371 |
| 4,876,183 | | 10/1989 | Miyasaka et al. ................... 430/567 |
| 4,963,476 | * | 10/1990 | Sugimoto et al. ................... 430/574 |
| 5,415,978 | * | 5/1995 | Asami et al. ........................ 430/363 |

FOREIGN PATENT DOCUMENTS

| | | | |
|---|---|---|---|
| 160137 | * | 7/1922 | (GB) .................................... 430/371 |
| 472346 | * | 9/1937 | (GB) .................................... 430/371 |

OTHER PUBLICATIONS

Seyentz, A., "A Review of Dye–Toning Processes", The British Journal of Photgraphy, vol. 71, pp–611–614, Oct. 1924.*

Keller, Karlheinz, "Science and Technology of Photography", VCH pp. 13–23, 43–82, 119 and 136, 1993.*

(List continued on next page.)

*Primary Examiner*—Martin Angebranndt
(74) *Attorney, Agent, or Firm*—Blank Rome Comisky & McCauley LLP

(57) ABSTRACT

This invention concerns a luminescent optical memory material and method of forming this material, including the encoding of information by a photographic process. The method involves the use of silver halide crystals of a defined size range, with the optional use of sensitizers, emulsion stabilizers, and other agents followed by the absorption of luminescent dyes on the developed silver particle to form a luminescent optical memory system. The method involves synthesis of a photographic emulsion with silver halide crystals of a defined size range, applying photographic emulsion to a substrate, exposing to light photochemical treatment and a process of transformation of the silver particles formed in the places exposed by light into luminescent particles. The method involves obtaining a multilayer luminescent material for a three-dimensional optical memory devices.

15 Claims, 1 Drawing Sheet

OTHER PUBLICATIONS

Zweig, A., "Photochemical Generation of Stable Fluorescent Compounds (Photofluorescence)," Pure and Applied Chemistry, vol. 33, pp. 389–410 (1973).

Venkataraman, K., "The Chemistry of Synthetic Dyes," vol. II, Nature 166, 997 (1950) (in Russian).

James, T.H., "The Theory of the Photographic Process," $4^{th}$ Ed. (1980) (in Russian).

Krasovicsky, B.M. and Bolotin, B.M., "Organic Luminescence," (1984) (in Russian).

* cited by examiner

TWO PHOTON WRITING THE INFORMATION INTO THE 3D-MEMORY

SILVER HALIDE MATERIAL FOR OPTICAL MEMORY DEVICES WITH LUMINESCENT READING AND METHODS FOR THE TREATMENT THEREOF

This application is a continuation in part of U.S. application Ser. No. 60/038,918 abandoned filed Feb. 24, 1997 and herein incorporates by reference that application for all purposes.

FIELD OF THE INVENTION

The present invention is directed to the field of materials for optical recording, storing and reading of information, including systems for 3-D optical memory based on luminescent compounds which can be used with CD-ROM systems.

The next generation of computer memories will be connected with memory systems using super dense optical memory materials to take advantage of these materials memory storage density and access speed. The optical disks of CD-ROM's are examples of optical memory systems.

The disadvantages of current CD-ROM's are an insufficient density of memory, insufficient amount of memory and unfavorable ratio of signal-to-noise for the next generation of computers.

Presently, some new materials, including the materials of the invention with luminescent properties for the reading of information, have been suggested for the improved optical memory systems that are under development. Such materials have an increased recording density, a high signal-to-noise ratio, and increased stability during storage and utilization.

BACKGROUND OF THE INVENTION

There are different prior art systems for optical recording based on the forming of fluorescent compounds from non-fluorescent precursors, including the UV-light exposed compounds of bis-diarylchloromethyl-1,3,4-oxadiazoles which are disclosed in U.S. Pat. No. 3,869,363. Moreover, many other systems are described in Zweig "Photochemical Generation of Stable Fluorescent Compounds" in Pure and Applied Chemistry, Vol. 33, 389–410 (1973) herein incorporated by reference. The main disadvantage of systems using these compounds is the requirement to use lasers with wavelengths shorter than 500 nm for the reading of stored information in the system. Thus, these systems exclude the possible use of modern diode lasers with wavelengths over 600 nm for reading the information in the storage device.

Photochromic lactams of Rhodamine B and peri-phenoxy derivatives of polycyclic p-quinones are suggested for use in these memory devices in which the luminophores are photochemically generated (U.S. Provisional Patent Application No. 60/03,258 filed on Dec. 10, 1996 and U.S. Provisional Patent Application No. 60/033,709 filed on Dec. 20, 1996, serial numbers not yet assigned, herein incorporated by reference). These compounds can be used in optical memory devices employing modern diode lasers with the wavelengths over 600 nm for reading the stored information. However, photochromic systems based on the generation of luminescent products have the common disadvantage of the destruction of the photoinduced luminescent product during the reading process. Moreover, these systems have low light sensitivities which then requires high energy densities of irradiation during the recording process which can lead to destruction of the memory material.

SUMMARY OF THE INVENTION

This invention provides for a super dense optical memory material for information storage and use with computers. The invention includes the formation of silver halide crystals of a defined size and the optional treatment of these silver halide crystals with sensitizers and/or spectral sensitizers. The silver halide crystals of the invention are then exposed to light, developed and fixed. The silver grains can then be treated with luminescent dyes to form the luminescent particles of the invention. Alternatively, the silver particles or the surface of the silver particles can be oxidized and luminescent dyes sorbed onto the oxidized surface or the oxidized particles can be treated to form insoluble salts which are then treated with luminescent dyes to form the luminescent particles of the invention. In addition, polyvalent cations can be sorbed onto the surface of the silver particles, the oxidized silver particles, the silver salts or the insoluble salts to form luminescent metal complex compounds. In addition, mercapto- or benzotriazoyl compounds can be used to promote the adsorption of the luminescent dyes onto the silver or other insoluble particles.

The optical memory material of the invention can be formed either into a single layer of polymer with silver halide crystals or a three dimensional memory material can be formed by stacking layers of silver halide material dispersed in a polymer with layers of silver halide free material. Alternatively, relatively thick layers of silver halide material can be used to form a three dimensional material.

The invention includes a two laser system for the two photon writing of information within a three dimensional optical matrix.

DETAILED DESCRIPTION OF THE INVENTION

Figure 1:
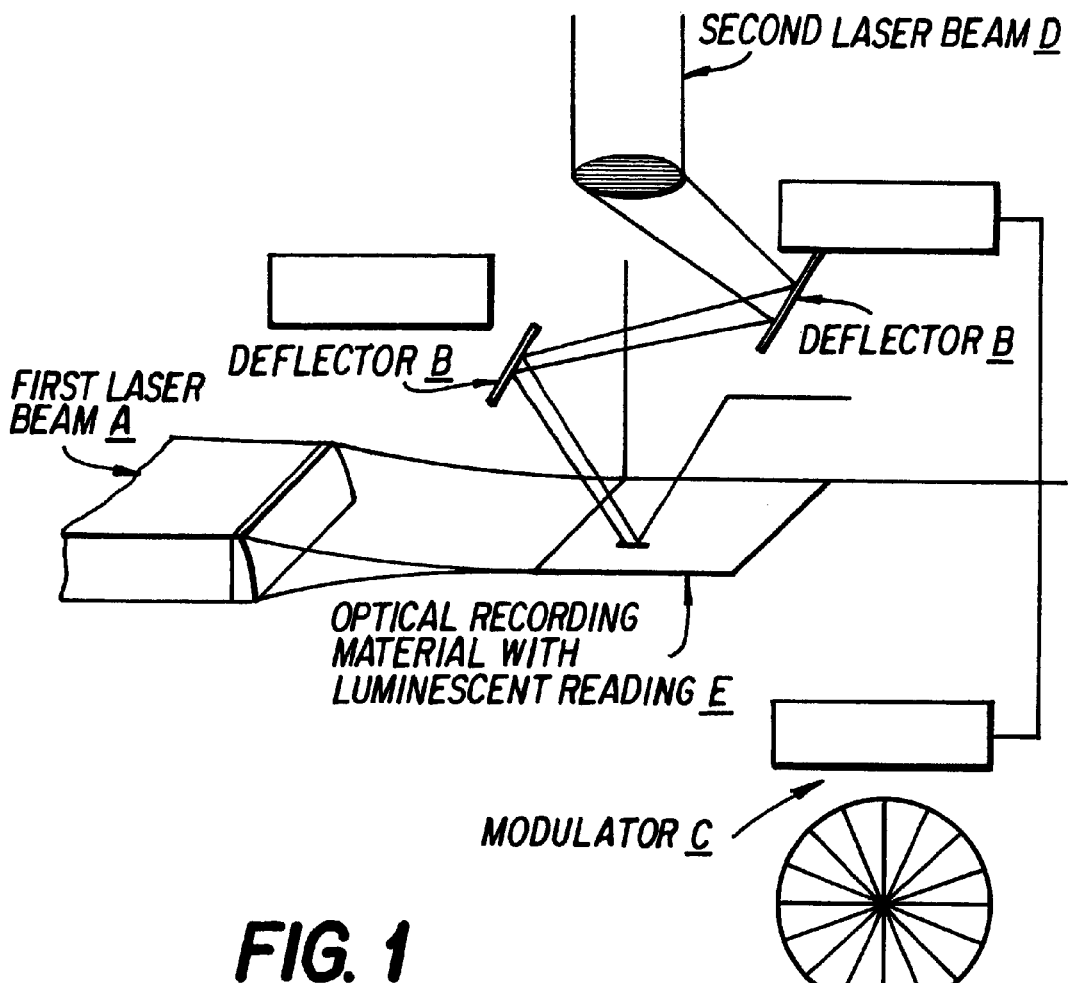
FIG. 1 shows a schematic of a two laser system for the writing of information into a three dimensional optical memory.

In the known photographic process of image registration, by light exposure of the silver halide material containing microcrystals of AgHal in the hydrophilic polymer, followed by further development of the latent photographic image in a water solution of the reducer. The process includes image fixation by dissolving non-irradiated silver halide therein leaving the exposed silver grains. (T. H. James, "The theory of the photographic process", 4th Ed. MacMillan Publish Co., N.Y., London, 1977 herein incorporated by reference). Examples of the light sensitive compounds of the invention include microcrystals of AgCl, AgCl(Br), AgCl(Br,I), AgBr and AgBr(I). The dimensions of the microcrystals of AgHal of the invention are in the range of 0.02 to 5 $\mu$m.

The microcrystals of the invention can be treated with gold and sulfur as well as reduction sensitization processes to increase their light sensitivity. The spectral sensitization of the silver halide microcrystals of the invention by polymethine dyes is used in all ranges of visible and near infra-red light to increase the sensitivity of silver halide. The field of spectral sensitivity encompasses the range from about 300 to 1500 nm.

Gelatine or gelatine modified by polymers is used as a hydrophilic polymer in the invention. The gelatine modified with hydrophilic polymers can include gelatine modified with polyvinyl alcohol, polyvinylpyrrolidone, polyvinyl sulphate, carboxymethylcellulose, cellulose acetophthalate, phthaloylgelatine or graft polymers of gelatine with polymethoxydiethyleneglycol acrylate or with polydiacetoneacrylamide or with poly-N,N'-methylenediacrylamide and can be used as the hydrophilic polymer of the invention. The photographic layer is coated over the base, gelatinated, hardened to provide a gelatine layer with the necessary physical-mechanical properties and dried. The thickness of the dried photographic layer of the invention can be vary from 1 to 100 microns.

The light sensitivity of photo materials of the invention is from about $10^{-2}$ to $10^{4}$ erg/cm$^{2}$ (from $10^{-3}$ to $10^{3}$ of ISO units), and is dependant on the crystal size. The photomaterials have resolution values of about $10^{2}$ to greater than $10^{4}$ lines/mm.

The advantages of the silver halide materials of the invention are: high light sensitivity, high resolution, time stability and mainly the threshold character of the response to light in the form of a "yes-no" response indicating sufficient or insufficient exposure to light. Each of the microcrystals of AgHal need to obtain at least four quanta of light to react. Thus, the quantum sensitivity of the microcrystal has a value of $n \geq 4$. The threshold character of photochemical sensitivity of a single AgHal microcrystal permits the recording of information by each microcrystal both at the surface and inside the emulsion layer. In other words, the threshold value of energy can influence a predetermined microcrystal in the layer. It is possible while exposing the layer to one or two laser beams with an energy at the predetermined point of the layer above the threshold value of quantum sensitivity of the microcrystal to influence a predetermined microcrystal.

The main disadvantage of the classic photomaterial is the reading of the information by only the integral light absorption on a unit of the area. In other words the information is read by the difference in light absorption by the developed film. Because of the nonselective absorption of light in the visible and infrared ranges by silver imaging, the information cannot be read from the depth of the exposed crystal in the photographic layer, meaning that the information recorded on each microcrystal of the AgHal cannot be read. The other disadvantage of this material is that it has a poor signal-to-noise ratio during the reading process. The signal-to-noise is determined by reading the reflected light from the film therefore, the contribution to the poor signal-to-noise ratio by light scattering is significant.

The present invention is directed towards optical recording materials with luminescent reading overcoming the disadvantages of the known optical recording materials and the classical silver halide photomaterials. Such materials provide increased recording density, an increased ratio of signal-to-noise and stability of information while storing and reading the material. Moreover, such materials provide the recording and reading of information by using light sources with different wavelengths, including infrared wavelengths not only in 2-dimensional, but also in 3-dimensional space. This is achieved by using silver halide material with high resolution ability (2,400 or more lines/mm), and with higher light sensitivity and with a wider region of spectral sensitivity from 300 to 1000 nm than known optical memory materials with luminescent reading. The further treatment and Ag transformation to the image to give particles luminescing in the spectral range from 400–850 nm, provides a great increase in the reading efficiency. Moreover, a variant of the process is possible wherein the unexposed matrix is luminescent and where the matrix has been exposed to light there is no luminescence. Methods of photographic emulsion sythesis, chemical and spectral sensitization, stabilization, hardening, and chemicophotographic treatment are described in the monograph by T. H. James *The Theory of the Photographic Process*, 4th Edition, MacMillan Publishing Co. N.Y., London (1977) herein incorporated by reference.

For information recording, the transparent fine-grain silver halide emulsions are used with the microcrystal particle size being less then 0.2 microns, preferably 0.08–0.03 microns and with the silver halides of AgCl, AgCl(Br), AgCl(Br,I), AgBr, or AgBr(I) being suitable. The photographic emulsions are obtained by the method of two flowing controlled emulsification in the hydrophilic film forming polymer. As the hydrophilic polymer, a gelatine or its polymer modification, polyvinyl alcohol and others can be used.

The microcrystals of AgHal can be subjected to chemical sensitization by compounds containing labile sulfur (for example, $Na_2S_2O_3$, thiourea), the gold compounds (such as, $HAuCl_4$, AuCNS and others), and also reduction compounds such as, $SnCl_2$, dioxide of thiourea and borohydrides. The photographic emulsions can be stabilized by organic stabilizers, such as 4-hydroxy-6-methyl-1,3,3a,7-tetraazaindene, 1-phenyl-5-mercaptotetrazole, 2-mercapto-5-nitro-benzimadazole, the sodium or potassium salts of 2-mercapto-5-sulphobenzoxazole, 2-mercaptobenzothiazole, 2-mercaptobenzoxazole and thiadiazole. The photographic emulsions are subjected to the spectral sensitization by polymethine dyes (cyanine dyes) in the range of visible and near- infra-red spectrum as represented by the general chemical formula (A)

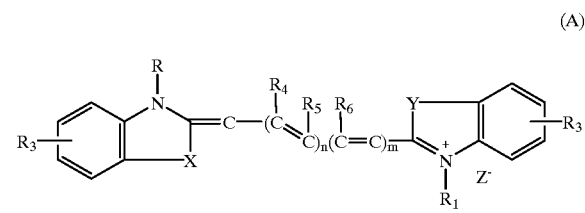

(A)

where in the case of the benzothiazole derivatives (X,Y= S); benzoxazole derivative (X,Y=O); benzimidazole derivative (X,Y=NR); quinoline derivative (X,Y=—CH=CH—); indolenine derivative (X,Y=C(R$_2$)) and so on. For the non-symmetrical dyes X does not equal Y (X≠Y), for example, X=O, and Y=S and are independently selected. Wherein, for each derivative $R_2$ and $R_3$ are independently selected from H, $CH_3$, —$OCH_3$, —$SCH_3$, —$N(CH_3)$, —$N(Et)_2$, —$N(Propyl)_2$, —$N(iso-propyl)_2$, —$N(butyl)_2$, —$N(iso-butyl)_2$, —$N(sec-butyl)_2$, —$NCO(CH_2)_kH$ wherein k is 1 to 5, F, Cl, Br, I, —CN, —$CO_2H$, —$CO_2(CH_2)_jCH_3$ where j is 0 to 4, —$CONH_2$, —$CF_3$, $SOCF_3$, $SO_2CF_3$, —$C_6H_5$, and benzyl; n is 0, 1 or 2 and m is 0 or 1; when n is 0 and m is 1 then $R^6$ is independently selected from H, $CH_3$, $C_2H_5$, $C_6H_5$, —$NH_2$, —$NHCOCH_3$, —$OCH_3$, $CO_2CH_3$; when n is 1 and m is 1 then $R_4$ and $R_6$ are H and $R_5$ H, $CH_3$, $C_2H_5$, $NHCOCH_3$, when $R_4$ and $R_6$ are linked together and $R_4$ and $R_6$ are —$(CH_2)_2$—, —$(CH_2)_3$—, or —$CH_2C(CH_3)_2CH_2$— then $R_5$ is H, Cl, and $C_6H_5$; when n is 2 and m is 1 then $R_4$, $R_5$ and $R_6$ are H or $R_4$ and $R_6$ are H and $R_5$ and $R_5$ is linked together and $R_5$ is —$(CH_2)_3$—, —$CH_2C(CH_3)_2CH_2$—; and when R and $R_1$ are independently selected from alkyl then $Z^-$ is an anion and when R and $R_1$ are independently selected from —$(CH_2)_3SO_3^-$ then $Z^+$ is a cation. Additionally, the merocyanines and merocyaninocyanines and others can be used.

The layers are treated with inorganic hardeners (potassium alum or chrome-potassium alum) or with the traditional organic hardeners from the class of aldehydes, derivatives of triazoles, oxiranes, vinyl sulfonyl derivatives and others.

Photographic layers are subjected to development and fixation after exposure to light. Formed image consisting of particles of Ag, oxidized and converted into the colorless or weakly colored insoluble salts with solubility products less then $10^{-8}$, preferably less than $10^{-10}$ moles/liter at 25° C. As insoluble salts, AgSCN, AgCN, AgI, $Ag_2Cr_2O_7$, $Ag_2WO_4$, $Ag_4[Fe(CN_6)]$ are used. For this purpose the inorganic soluble salts comprising anions of $SCN^-$, $CN^{31}$, $I^-$, $Cr_2O^{2-}_7$, $WO^{2-}_4$, $[Fe(CN_6)]^{4-}$ and others are added to a bleaching vessel containing an oxidizer such as, $K_3[Fe(CN_6)]$, salts of $Fe^{3+}$, $Cu^{2+}$, quinones and others. The silver oxidation can be conducted with the present of organic acids or their salts, for example, oxalates or citrates of the alkaline metals, and the benzotriazoles 1-mercapto-5-phenyl triazole 2-mercapto-5-nitrobenzamidazole, 2-mercapto-5-sulphobenzoxazole as the respective sodium or potassium salts, to obtain insoluble silver salts. The silver of an image can be transformed in a subsequent process to an insoluble salt that does not contain silver ions for example $Zn_2[Fe(CN_6)]$, $Cd_2[Fe(CN_6)]$, ZnS, CdS, $BaSO_4$ and others.

The three basic methods can be used for the obtaining luminescent particles in the layer:
1. Adsorption of the luminescent dyes on the insoluble silver or other cationic salts.
2. Preliminary adsorption of polyvalent cations such as, $Zn^{2+}$, $Cd^{2+}$, $Sr^{2+}$, $Ni^{2+}$, $Co^{2+}$, $Fe^{3+}$, $Cr^{3+}$, $In^{3+}$, $Bi^{3+}$, $La^{3+}$, $Gd^{3+}$, $V^{4+}$, $Cl^{4+}$, $Th^{4+}$, and others on the silver salts or other insoluble salts, with the further adsorption of the dyes leading to the formation of luminescent metal-complex compounds.
3. Adsorption of luminescent dyes onto the silver salts or other insoluble salts, comprising a mercapto- or benzotriazolyl groups promoting the adsorption of the dye onto the silver or other insoluble salts. Alternatively, preliminary adsorption of polyvalent anions such as $[Fe(CN)_6]^{-4}$, $WO_4^{-2}$, $MoO_4^{-2}$ and others, followed by treatment with mercapto- compounds or benzotriazole to promote the adsorption of the luminescent dyes with some dyes may be preferred.

Alternatively, optical memory devices wherein the matrix is luminescent and the silver particles are doped with multiply charged cations such as $Cu^{+2}$, $Mn^{+2}$ and others can also be prepared. The silver particles are doped by the adsorption of the multiply charged cations onto the silver particles. The doped silver particle then suppress the luminescence of the luminescent dyes in the matrix adjacent to the particle.

For light sensitive mediums, vacuum sublimated silver halide can be used, which is then subjected to the same treatment as the emulsion layers of AgHal. The silver halide emulsion can also be applied in layers to obtain a multi-layered material.

The luminescent compounds can be selected from the following organic dyes described in Krasovitsky, B. M.; Bolotin, B. M. *Organic Luminophores* Moscow: Chimia 1984, 336p (Russian); K. Venkataraman, *The Chemistry of Synthetic Dyes* New York: Academic Press Inc. 1952, Vol. 2 both references herein incorporated by refernce.

1. The xanthene dyes of the eoscin type including eosins, fluoresceins, erythrosins, and dichlorofluorescein of general structure I.

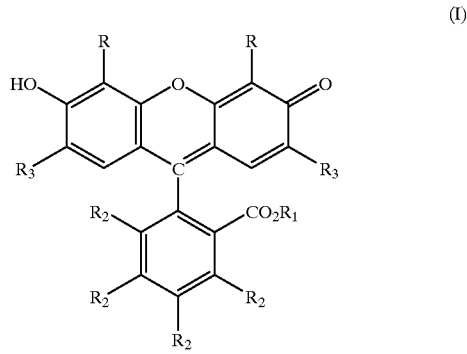

(I)

wherein R is independently selected from H, Cl, Br, I, $NO_2$, alkyl and others; $R_1$ is H, Na, K, Alkyl; $R_2$ is independently selected from H, Cl, $NH_2$, Br, I, isocyanate, isothiocyanate, alkyl anf others; and $R_3$ is independently selected from H, Cl, Br, I, $NO_2$, $NH_2$, alkyl and others.

2. The xanthene dyes of the rhodamine type including the rhodamines B, 3B, C, G, 6G, 101, 123 and others having the general structure II.

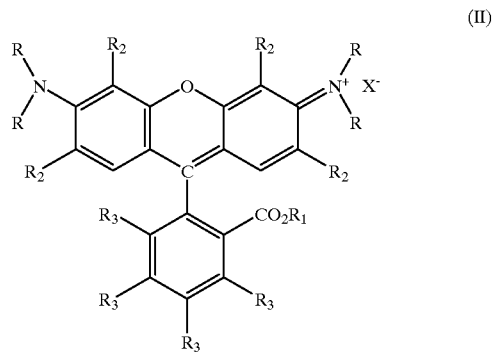

(II)

wherein R is H, $CH_3$, $C_2H_5$, $CH_2COOH$, $C_2H_4OH$ and others; $R_1$ is H, Na, K, $CH_3$, $C_2H_5$, Ar, Alkyl and others; $R_2$ is independently selected from H, Cl, Br, I, $NO_2$, alkyl and others, $R_3$ is independently selected from H, Cl, Br, I, $NO_2$, isothiocyanate, isocyanate, amines and others and X is an anion selected from $Cl^-$, $Br^-$, $I^-$, $ClO_4^-$ and others.

3. The acridine dyes, including aurazine, trypaflovine, ethoxydiaminoacridine lactate and others of general structure III.

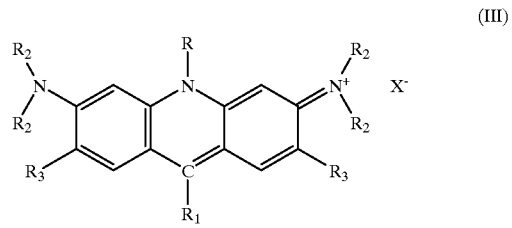

(III)

wherein R is H, $CH_3$, $C_2H_5$, and others; $R_1$ is H, $C_6H_5$, $CO_2H$ and others; $R_2$ is H, $CH_2CH_2OH$, alkyl and others; $R_3$ is independently selected from H, $CH_3$, alkyl and others; and X is a anion of F, Cl, Br, I, $HCOO^-$, $CH_3CHOHCOO^-$, $ClO_4^-$ and others.

4. The oxazine dyes, including the oxazines 1, 4, 9, 17, 118, nile blue, capry blue A and others having the general structure IVa and IVb:

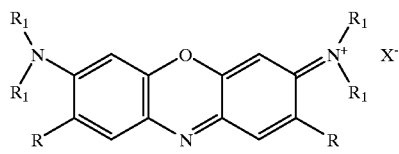

(IVa)

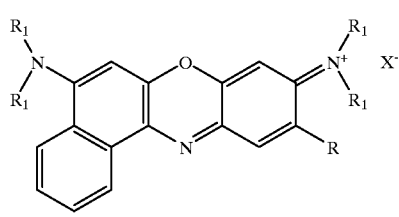

(IVb)

where R is selected from H, $CH_3$, and others; $R_1$ is independently selected from H, $CH_3$, $CH_3CH_2$ alkyl and others and X is an anion selected from F, Cl, Br, I, $ClO_4^-$, sulfates, phosphates and others.

5. The azine dyes, including magdala red, lactoflavine, of general structure V:

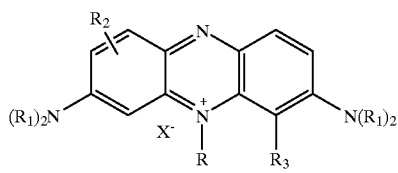

(V)

wherein R is phenyl, naphthyl; $R_1$ is H, alkyl, $C_6H_5$, and others; $R_2$ is H, alkyl, benzyl, O-benzyl; $R_3$ is H, $SO_3H$ and others; and X is an anion.

6. The indigo dyes, in the form of indigozoles, of general structure VI:

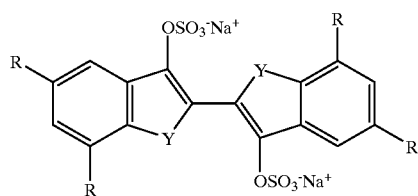

(VI)

wherein, Y is NH, S and R is independently selected from H, Cl, Br, O-alkyl, $NO_2$, sulfate, alkyl and others.

7. The polycyclic vat dyes, including aminoanthropyrimidines, anthropyridones, oxa-and tiadiazoloaminoantroquinones, dyes from the group of benzanthrones in the form of sulfuric esters of leuco compounds of general structure VII–XI:

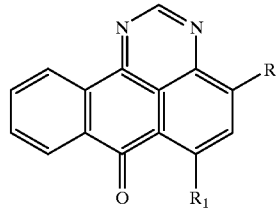

(VII)

where R is H, $NH-C_6H_5$, $R_1$ is H, NHCOAr

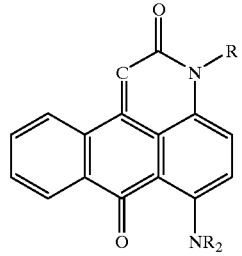

(VIII)

where R is H, alkyl, or aromatic

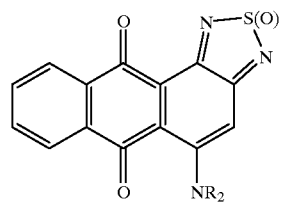

(IX)

where R is H, $C_6H_{11}$, $C_2H_5$, $C_2H_4OH$.

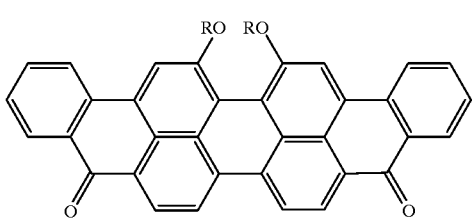

(X)

where R is H, Ar, $-SO_2Ar$ and others.

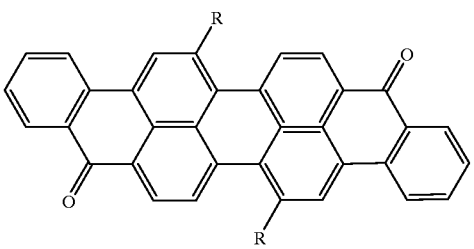

(XI)

where R is independently selected from H, Cl, Br, OH, the structure:

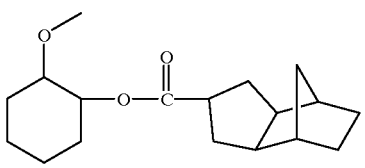

and others.

8. The dyes which are forming both the luminescent and non-luminescent complexes with polyvalent metal ions, selected from the hydroxyantraquinone derivatives: calcein, calcein blue, xanthocomplexan, methylcalcein, methylcalcein blue as shown in general structures XII–XVII.

(XII)

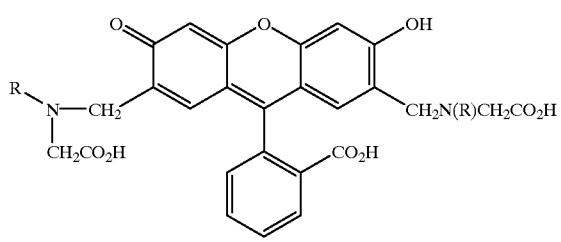

(XIII)

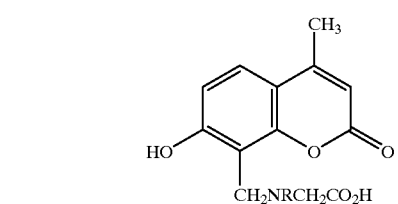

Where R is $CH_3$, $CH_2COOH$ (XIV)

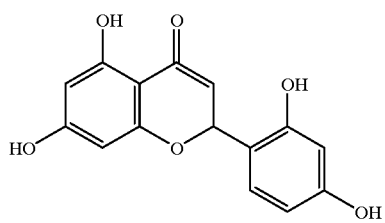

(XV)

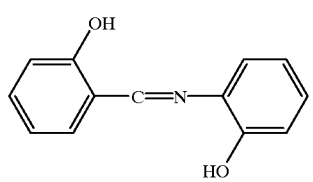

(XVI)

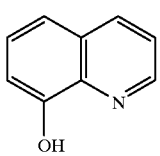

(XVII)

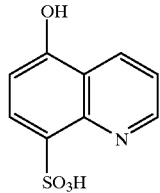

9. The cyanine dyes of general structure XVIII.

(XVIII)

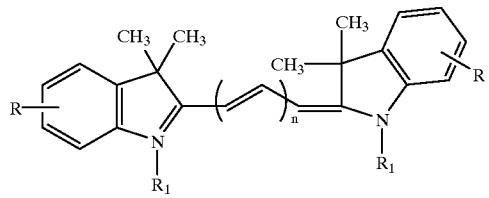

wherein n is 1,2,3; R is H, $SO_3H$ and others; $R_1$ is alkyl, $(CH_2)_m SO_3H$ and others m is 3,4 or 5 and $X^-$ is a anion.

Multi-layer material for use in a three-dimensional memory can be prepared by stacking single silver halide layers on transparent, silver halide free layers with a thickness of 20–30 microns. Preferably, the three dimensional, multi-layered material can be prepared by the following extrusion process. The process comprises simultaneously extruding from a multi-slit filler relatively thick layers of at least one of the hydrophilic polymers previously discussed without silver halide between relatively thin layers of a hydrophilic polymer with silver halide to obtain a multi-layer structure of alternating layers of silver less and silver halide containing material. The number of layers can be varied from two to twenty or more. The thickness of the layers of hydrophilic polymer without silver halide can be varied from about 15 to about 30 microns, preferably about 20 to about 30 microns and the thickness of the layer with silver halide can range from about 0.75 to about 5 microns, preferably about 1.0 to about 1.5 microns. The silver halide material of the different layers can be spectrally sensitized to different parts of the visible and infra-red spectrum and the recording of information can then occur through the use of a mask with selective light filters. In an analogous manner, the non-silver halide gelatine layers can contain dyes that are matched or mismatched with the spectrally sensitized silver halide so as to allow the writing of information in the silver halide layers by the use of diode or other lasers.

A method of producing a multi-layered optical memory material consists of producing a silver halide one-layered material by pouring the silver halide emulsion layer with thickness 0.5–1.0 micron on a base selected from cellulose acetates, polycarbonate, or polyethyleneterephthalate with thickness 20–40 microns, recording optical information thereon, further photochemical treatment and silver image transformation into image luminescing in the spectral range from 400 to 850 nm. For obtaining multi-layered materials the one-layered materials are sequentially glued one to other so that the active silver halide emulsion layers alternate with the inactive separating polymeric layers which are transparent for a reading laser beam and the resulting luminescent light. Such material can contain two or more silver halide layers. Information reading is carried out by detection of the luminescent light irradiated, when a reading laser beam is focused on the active layers in the points containing luminescent dye.

For the purpose of recording three dimensional information by two sources of light, for example by the recording device shown in FIG. 1, a multi-layer material with silver halide layers having the same activity can be used. The silver halide layers of multi-layer materials can also be spectrally sensitized with polymethine dyes to different wavelengths of visible or infra-red light. Filter dyes can also be introduced into the silver halide layers or interlayers for providing color filtration. Such layers can have information recorded on them by printing through color separated masks as is well known in the printing industry. The multi-layer materials, after exposure to light, are developed and treated similarly to the monolayer materials.

Another method of producing a multi-layered optical memory device consists of the extrusion of a multi-layer system on a moving polymer film with thickness 150–300 microns. The process comprises simultaneous extruding from a multi-slit filler relatively thin (0.5–1.5 microns) layers of hydrophilic polymer with silver halide and between these layers, relatively thick (20–30 microns) layers of hydrophilic polymer without silver halide to obtain a structure of alternating silver halide containing (active) and silver halide less (inactive) layers. The number of the active layers can be two or more.

The following examples are provided in order to further illustrate the invention but should not be construed as limiting the scope thereof.

EXAMPLE 1

The Synthesis of the AgBr-emulsion

The synthesis of the super fine grain emulsion of AgBr was conducted by two flow emulsification method at a pAg of 2.3 (ie at silver concentration of $[Ag^+]=10^{-2.3}$ moles per liter) at 40° C. in an apparatus with a 1.5 liter capacity. The velocity of the supply solutions of $AgNO_3$ (1M) and KBr (1M) was about $3\times10^{-7}$ g-mol/sec cm$^3$. The concentration of the inert gelatin was 50 g/liter and the mixing up velocity was 1,200 rotation/min. The average size of the AgBr microcrystals was about 0.05–0.055 microns. The silver content of the emulsion was 16 g/liter. The emulsion was washed in running saltless water at 10° C. for 30 min. The liquid AgBr emulsion then had pyrocatechol (0.1 g/l) and coat additives such as surfactants, glycerine and thimol and hardeners such as chromium acetate were added. The viscosity of the emulsion before the coating of the base was 5.3 centipoise at 40° C. The emulsion was coated upon gelatine laid glass to obtain a 1.5 g/m$^2$ surface concentration of silver and transparent layers were obtained. Photoplates were exposed by a FSR-41 sensitometer at a color temperature of 5900° C. of the light source. Exposed photoplates were developed with the developer D-19 for 5 minutes at 20° C. The plates were fixed in the hardening fixative F-10 for 5 minutes, washed with water and dried. The prepared photoplates had the following characteristics:

1. The light sensitivity by the darkening density criterion of 0.85 above the density of the fog is equal to $4\times10^{-2}$ units ISO;
2. The resolution was 4000 lines per millimeter;
3. The contrast coefficient was 9.0;
4. The maximum density of darkening was over 3.0
5. The density of fog was 0.02; and
6. The region of spectral sensitivity was from 300 to 460 nm.

EXAMPLE 2

The Synthesis of the AgBr(I)-emulsion

The super fine grain emulsion of AgBr(I) (0.7% mol. AgI) was synthesized by the two flow controlled emulsification method at pAg of 2.3 at 40° C., similarly to Example 1 but the mixture of the KBr and KI solution was added to the $AgNO_3$ solution. The silver content of the emulsion after being washed was 15 g/liter, and the concentration of gelatin was 3.0% by weight. The average size of the microcrystals was 0.03 to 0.04 microns. Photoplates were prepared, exposed and treated in the same manner as the photoplates of Example 1. The photoplates had the following characteristics:

1. The light sensitivity of $6\times10^{-2}$ units ISO;
2. The resolution was 4500 lines per millimeter;
3. The contrast coefficient was 7.0;
4. The maximum density of darkening was over 3.0
5. The density of fog was 0.02; and
6. The region of spectral sensitivity was from 300 to 500 nm.

EXAMPLE 3

The Synthesis of the AgCl-emulsion

The super fine grain emulsion of AgCl was obtained in a similar manner as Example 1, but instead of KBr, KCl was used. The average size of the cubical microcrystals of AgCl was 0.06 to 0.07 microns. Photoplates were prepared, exposed and treated in the same manner as the photoplates of Example 1. The photoplates had the following characteristics:

1. The light sensitivity of $0.5\times10^{-2}$ units ISO;
2. The resolution was 3000 lines per millimeter;
3. The contrast coefficient was 10.0;
4. The maximum density of darkening was over 3.0
5. The density of fog was 0.02; and
6. The region of spectral sensitivity was from 300 to 400 nm.

EXAMPLE 4

To the liquid AgBr-emulsion, synthesized similarly to Example 1, at 40° C., pyrocatechol (0.1 g/liter), the disodium salt of 4,4'-bis-(4,6-diphenoxy-1,3,5-triazinyl-2-amino)-stilbene-2,2'-disulfonic acid (1 g/liter), and 3,3'-diethyl-6,7,6',7'-dibenzo-11-methyl-tiatricarbocyanineiodide as an alcohol solution with a concentration of $2\times10^{-4}$ mol/mol of AgBr, were added. After adding the dye, the concentration of the silver ion was increased to pAg of 6.5 by 1M $AgNO_3$. The coat additives, including a surfactant, glycerin and thymol and a hardener, such as chromium acetate, were added before coating the base with the emulsion. The viscosity of the emulsion before coating was 5.3 centipoise at 40° C. The emulsion was coated upon the gelatine layered glass to obtain a silver surface concentration of 1.5 g/m$^2$.

Photoplates were exposed by a FSP-41 sensitometer behind a KS-14 light filter at a color temperature of 2,850° C. of the light source. Exposed photoplates were developed in the developer D-19 for 5 minutes at 20° C. degree.

The plates were fixed in the hardening fixative substance F-10 for 5 minutes, washed with water and dried.

The following characteristics were obtained:
1. The light sensitivity by the darkening density criterion of 0.85 above the density of the "fog" is equal to $4 \times 10^{-2}$ units ISO;
2. The resolution ability of 4000 lines/mm;
3. The contrast factor was 9.0;
4. The maximum density of darkening over 3.0;
5. The density of fog was 0.02 and
6. Maximum of spectral sensitization was 860 nm.

The energy sensitivity was measured by a ESP-73 spectrum sensitometer by the darkening density criterion of 0.5 at $\lambda=860$ nm is equal to $10^3$ erg/cm$^2$.

EXAMPLE 5

The procedure was the same as in Example 4, except that the spectral sensitizer 3,3'-diethyl-9,11-($\beta$-methyltrimethylene)thiatricarbocyanine iodide with a concentration of $3 \times 10^{-4}$ mol/mol of AgBr was used. The photo sensitivity of the photolayers at the maximum sensitivity of 820 nm was equal to $7 \times 10^2$ erg/cm$^2$. The resolution ability was 4,000 lines/mm.

EXAMPLE 6

The procedure used was the same as in Example 4, except that the spectral sensitizer 3,3'-diethyl-9,11-($\beta,\beta^1$-dimethytrimethylen)tiatetracarbocyanine iodide at a concentration of $1.5 \times 10^{-4}$ mol/mol of AgBr was used. The photo sensitivity of the photolayers at the maximum sensitization of 920 nm was equal to $2.0 \times 10^3$ erg/cm$^2$. The resolution ability was 3500 lines/mm.

EXAMPLE 7

The procedure used was the same as in Example 4, except that the spectral sensitizer 3,3',9-triethyl-4,5,4',5'-dibenzothiacarbocyan inosylate at concentration of $8 \times 10^{-4}$ mol/mol of AgBr was used. Instead of the disodium salt of 4,4'-bis-(4,6-diphenoxy-1,3,5-triazinyl-2-amino)-stilbene-2,2' disulfo acid, the 1,10-decamethylene-$\alpha$-picoline dibromide at a concentration of $8 \times 10^{-4}$ mol/mol of AgBr was used. The photo sensitivity of the photolayers at the maximum sensitivity at 680 nm was 500 erg/cm$^2$.

EXAMPLE 8

The procedure the same as in Example 7, except that the sensitizer, the pyridine salt of 3,3$^1$-di-sulfopropyl-5,5$^1$-diphenyl-9-ethyloxacarbocyanine with concentration of $10^{-3}$ mol/mol to AgBr was used. The photo sensitivity of photolayers at the maximum of sensitivity at 545 nm was 300 erg/cm$^2$.

EXAMPLE 9

The same as in Example 7, except that the sensitizer, the pyridine salt of 3,3$^1$-di-sulfopropyl-4,5benzo-5$^1$-methoxythiamonomethinecyanine with concentration of 8 $10^{-4}$ mol/mol to AgBr is used. The photo sensitivity at the maximum of sensitivity at 475 nm is 800 erg/cm$^2$.

EXAMPLE 10

The same as in Example 4, except that the AgCl emulsion is used. The photo sensitivity at the maximum of sensitivity at 850 nm is 3,000 erg/cm$^2$. The resolution ability is 3,000 lines/mm.

EXAMPLE 11

The silver images which was obtained on the samples made as in the Examples 2–10, is bleached at 0.1 M water solution of K$_3$[Fe(CN)$_6$]. The photolayers were washed with water, treated with 0.005% eritrosine solution and washed with water once more. The absorbed dye luminesces in the green region of the spectrum (max. abs. 547 nm., max. lum. 575 nm.)

EXAMPLE 12

The same as in Example 11, except that in the capacity of the luminescent dye, the 0.015% water solution of the fluorescein is used. The absorbed dye is luminescing in the green range of spectrum.

EXAMPLE 13

The same as in Example 11, except that in the bleached solution the benzotriazole is used. The Rodamine 101 is used as the luminescent dye. The absorbed dye is luminescing in the orange-yellow range of spectrum (max. abs. 560 nm, max. lum. 575 nm).

EXAMPLE 14

The silver images on the samples obtained in Examples 2–10 were bleached in 0.1 M aqueous solution of K$_3$[Fe(CN)$_6$], washed with water, treated with 0.3M aqueous solution of CdBr$_2$, washed with water, treated with a 2.0M aqueous solution of KCNS, than washed again with water and adsorbed eritrosine on formed Cd$_2$[Fe(CN)$_6$] from a 0.005% aqueous solution.

The adsorbed dye is luminescent in green region of spectrum (absorbtion $\lambda$max.545 nm, luminescence $\lambda$max 575 nm).

EXAMPLE 15

The same as in Example 14, except that after treatment with water solution of KCNS and washing with water, the samples are treated with 0.4M aqueous solution of Na$_2$S$_x$.H$_2$O, washed with water. The CdS particle then were treated with Rhodamin B in a 0.005% aqueous solution. The adsorbed dye was luminescent in the orange-yellow range of the spectrum (absorption $\lambda$max. 562 nm, luminescence $\lambda$max. 585 nm).

EXAMPLE 16

The same as Example 11, except that after bleaching in 0.1M solution of K$_3$[Fe(CN)$_6$] and washing with water, the samples were treated with a 2.0% water-alcohol (1:1) solution of 1-phenyl-5-mercaptotetrazole, washed with water and adsorbed on formed the silver salt of 1-phenyl-5-mercaptotetrazole triethylammonium salt of 3,3'-disulfopropyl-5,5'-dichloro-9-ethyloxacarbocyaninebetaine from $1.0 \times 10^{-5}$M solution. Adsorbed dye has adsorption $\lambda$max. 545 nm and luminescence $\lambda$max 580 nm.

EXAMPLE 17

The same as in Example 16, except that a 2.0% water-alcohol (1:1) solution 2-mercaptobenzoxazole was used and the pyridine salt of 3,3'-disulfopropyl-5,5'-dimethoxy-9-ethylthiacarbocyaninebetaine, was adsorbed on the formed silver salt of 2-mercaptobenzoxazole from $1.0 \times 10^{-5}$M solution. Adsorbed dye has absorption $\lambda$max. 650 nm, and luminescence $\lambda$max. 665 nm.

EXAMPLE 18

The same as in Example 16, except that a 2.0% water-alcohol (1:1) solution of 2-mercaptobenzimidazole was used and the potassium salt of 1,1,1', 1'-tetramethyl-3,3'-disulfopropylindodicarbocyanine from $1.0 \times 10^{-5}$M water solution was adsorbed on the formed Ag-salt of 2-mercaptobenzimidazole. Adsorbed dye has absorption λmax. 645 nm and luminescence λmax. 702 nm.

EXAMPLE 19

The same as in Example 16, except that a 2.0% water-alcohol solution of 2-mercaptobenzothiazol was used and 1,1,1',1',3,3'-hexamethylindocarbocyanineiodide was adsorbed from a $1.0 \times 10^{-5}$M water alcohol (1:1) solution on formed silver salt of 2-mercaptobenzothyazole. The places where there are particles with adsorbed salt do not luminesce and there was luminescence from the bulk polymer. The dye has an absorption λmax. 650 nm and luminescence λmax. 682 nm.

EXAMPLE 20

The same as in Example 11, except that after bleaching, the layer was treated with 0.1% solution of $Ga(NO_3)_3$ washed with water and treated with 0.05% solution of 8-oxiquinoline. The dye was adsorbed on the insoluble salts that were located at the places were the photolayer was exposed to light The adsorbed dye was luminescing in the yellow-green range of spectrum.

EXAMPLE 21

The same as in the Example 20, except that after bleaching, the exposed photolayer was treated with 0.1% solution of $Cu(NO_3)_3$ washed with water and treated with 0.2% water solution of methylcalcein. In the places where the photolayer was exposed to light and the copper salt had absorbed the dye had a yellow-green luminescence and the background was not luminescent.

EXAMPLE 22

Similarly to the Example 1, the AgBr emulsion was prepared and was divided into three parts. The first part of the emulsion was spectrally sensitized as in Example 4, the second part of the emulsion was spectrally sensitized as in Example 7 and the third one, as in Example 8. The sensitized emulsions were coated using a multi-slit filler by layers on to the gelatine coated polyethylene terephthalate base. For the information recording the photomaterial consistently exposed through the mask following the light filters, transmitting light with a wavelenghth of 860 mn, 680 nm and 545 nm. The photolayers were subjected to the photo-chemical treatment as in the Example 18 and with a 0.001% water solution of the sodium salt of $1,1^1$-di-γ-sulfopropyl-5,$5^1$-disulfo-3,3,$3^1$$3^1$-tetramethylindodicarbocyaninebetaine. The luminescence maximum of the absorbed dye was 700 nm.

EXAMPLE 23

The same as in the Example 22, except that the treatment of layers was conducted with 0.001% water solution of trisodium salt of 1,1'-di-γ-sulfopropyl 5,5'-disulfo-3,3,3',3'-tetramethyl-n-indotricarbocyaninebetaine. The maximum of luminescence –790 nm.

EXAMPLE 24

The silver halide systems are characterized of high photostability. The irradiation of the film obtained in Example 22, for 200 hours in a cuvett of a Shimadzu spectrofluorimeter at a wavelength of 640 nm used for fluorescent excitability did not lead to any changes in the fluorescent intensity. During similar film irradiation, based on the bis-dianilinochloromethyl-1,3,4-oxadiazole as in the U.S. Pat. No. 3,869,363, a decrease of the fluorescent intensitivity of 2.5 times was observed.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A method of digitally storing information, the method comprising:
   providing a layer comprising silver halide particles having a particle size less than about 0.2 microns;
   exposing said layer to light using two laser beams at at least one predetermined point of the layer;
   developing and fixation of said layer to form silver particles from the exposed silver halide;
   oxidizing the silver particles to form insoluble salt particles by an oxidizer selected from the group consisting of $K_3[Fe(CN)_6]$, $(NH_4)_2S_2O_8$, $KMnO_4$, $CuCl_2$, $FeCl_3$ and quinones, said oxidation being carried out in a presence of anions selected from the group consisting of $SCN^-$, $CN^-$, $Cr_2O_7^{2-}$, $WO_4^{2-}$, $[Fe(CN)_6]^{3-}$, oxalate, citrate and anions of 1-phenyl-5mercaptotetrazole, 2-mercapto-benzothiazole, 2-mercaptobenzoxazole, 2-mercaptobenzimidazole and organic mercapto compounds; and
   treating the layer with luminescing dye and allowing the luminescing dye to be sorbed onto the particles.

2. The method of claim 1, wherein said exposure to two lasers comprises two-photon writing of the data in a three-dimensional optical matrix in said material.

3. The method of claim 1, wherein the luminescing dye is selected from the group consisting of:
   the xanthene dyes selected from the group consisting of eosins, fluoresceins, erythrosins, and dichlorofluorescein of the following structure:

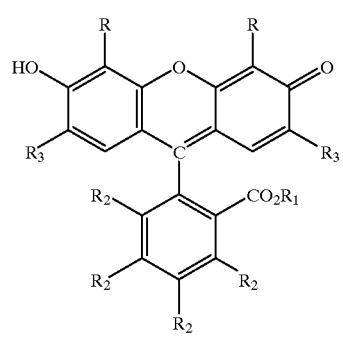

wherein R is independently selected from the group consisting of H, Cl, Br, I, $NO_2$, and alkyl; $R_1$ is H, Na, K, or Alkyl; $R_2$ is independently selected from the group consisting of H, Cl, $NH_2$, Br, I, isocyanate, isothiocyanate, and alkyl; and $R_3$ is independently selected from the group consisting of H, Cl, Br, I, $NO_2$, $NH_2$, and alkyl;

the xanthene dyes including the rhodamines B, 3B, C, G, 6G, 101, 123 having the following structure:

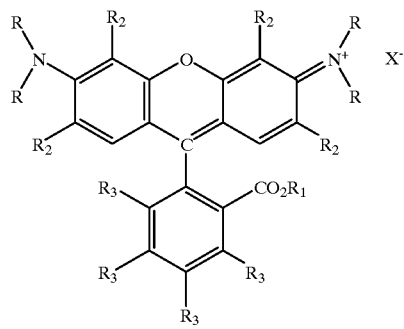

wherein R is H, $CH_3$, $C_2H_5$, $CH_2COOH$, or $C_2H_4OH$; $R_1$ is H, Na, K, $CH_3$, $C_2H_5$, Ar, or alkyl; $R_2$ is independently selected from the group consisting of H, Cl, Br, I, $NO_2$, and alkyl; $R_3$ is independently selected from H, Cl, Br, I, $NO_2$, isothiocyanate, isocyanate, and amines and X is an anion selected from $Cl^-$, $Br^-$, $I^-$, and $ClO_4^-$;

the acridine dyes selected from the group consisting of aurazine, trypaflovine, ethoxydiaminoacridine lactate and dyes having the following structure:

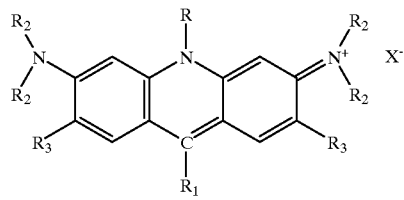

wherein R is H, $CH_3$, or $C_2H_5$; $R_1$ is independently selected from H, $C_6H_5$, and $CO_2H$; $R_2$ is independently selected from H, $CH_2CH_2OH$, and alkyl; $R_3$ is independently selected from H, $CH_3$, and alkyl; and X is a anion of F, Cl, Br, I, $HCOO^-$, $CH_3CHOHCOO^-$, or $ClO_4^-$;

the oxazine dyes selected from the group consisting of the oxazines 1, 4, 9, 17, 118, nile blue, capry blue A and dyes having the general structures:

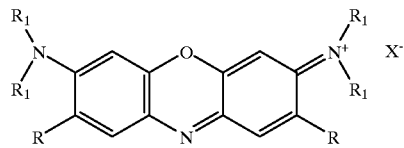

-continued

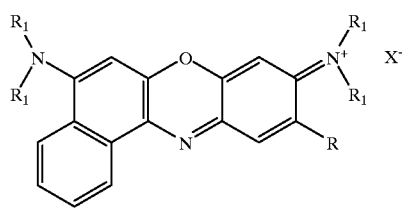

where R is selected from H, and $CH_3$; $R_1$ is independently selected from H, $CH_3$, $CH_3CH_2$ and alkyl and X is an anion selected from F, Cl, Br, I, $ClO_4^-$, sulfates, and phosphates;

the azine dyes selected from the group consisting of magdala red, lactoflavine, and dyes having the following structure:

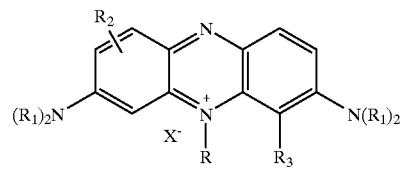

wherein R is phenyl, or naphthyl; $R_1$ is H, alkyl, or $C_6H_5$; $R_2$ is H, alkyl, benzyl, or O-benzyl; $R_3$ is H, or $SO_3H$, and X is an anion;

the indigo dyes, in the form of indigozoles, having the following structure:

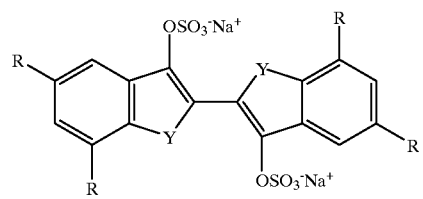

wherein, Y is NH, or S and R is independently selected from H, Cl, Br, O-alkyl, $NO_2$, sulfate, and alkyl;

the polycyclic vat dyes selected from the group consisting of aminoanthropyrimidines, anthropyridones, oxa-and tiadiazoloaminoantroquinones, and dyes from the group of benzanthrones in the form of sulfuric esters of leuco compounds having the following structures:

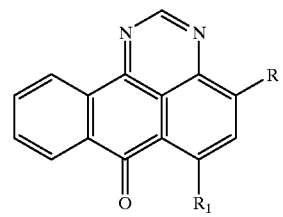

where R is H, or NH—C₆H₅; R₁ is H, or NHCOAr,

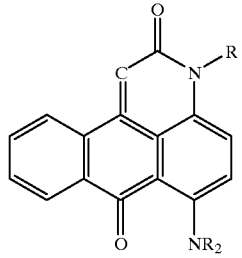

where R is H, alkyl, or aromatic,

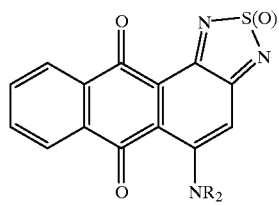

where R is H, C₆H₁₁, C₂H₅, or C₂H₄OH,

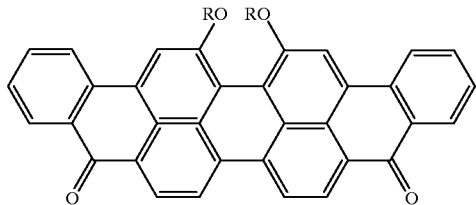

where R is H, Ar, or —SO₂Ar,

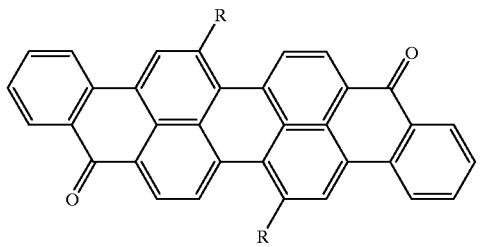

where R is independently selected from H, Cl, Br, OH, and the structure:

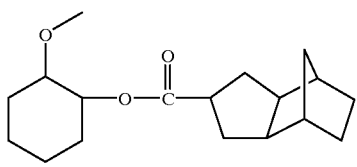

and dyes which are forming both the luminescent and non-luminescent complexes with polyvalent metal ions, selected from the hydroxyantraquinone derivatives: calcein, calcein blue, xanthocomplexan, methylcalcein, methylcalcein blue as shown in the following structures:

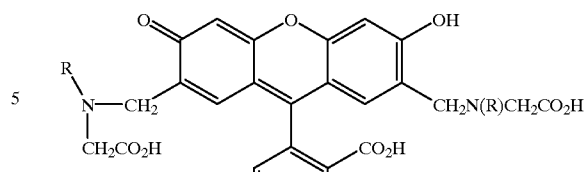

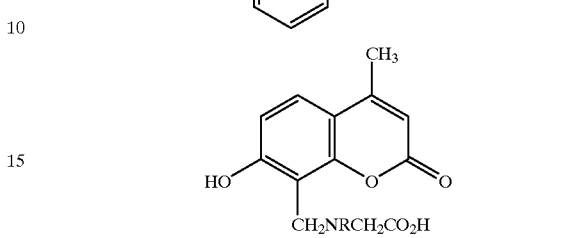

Where R is CH₃, or CH₂COOH,

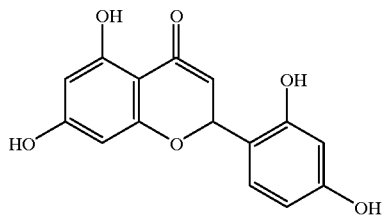

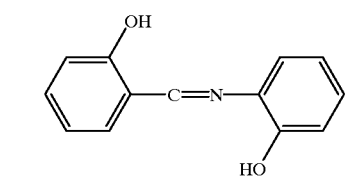

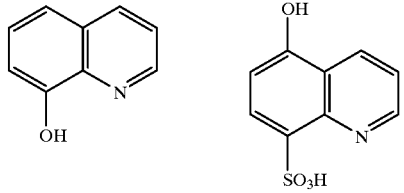

and the cyanine dyes of the following structure:

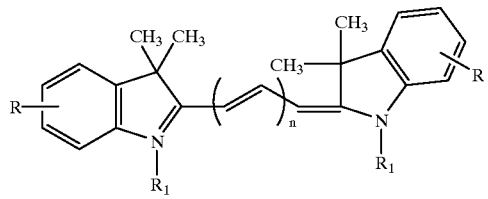

wherein n is 1,2,3; R is H, or SO₃H; R₁ is alkyl, or $(CH_2)_m SO_3 H$, m is 3,4 or 5 and X⁻ is an anion.

4. The method of claim 1, wherein the silver halide is selected from AgCl, AgBr, AgI, AgCl(Br), AgCl(Br,I) and AgBr(I).

5. The method of claim 1, wherein the microcrystals are about 0.02 to 0.08 microns.

6. The device of claim 5, wherein the water soluble polymer is selected from the group consisting of polyvinyl alcohol, polyvinyl pyrrolidone, gelatine, gelatine modified with polyvinyl alcohol, polyvinyl pyrrolidone, polyvinyl sulphate, carboxymethylcellulose, cellulose acetophthaloylgelatine or graft polymers of gelatine with polymethoxydiethyleneglycol acrylate, polydiacetoneacrylamide or poly-N,N'-methylenediacrylamide, and mixtures thereof.

7. The method of claim 1, additionally comprising the step of increasing light sensitivity of the photographic emulsion by addition of a chemical sensitizer to the emulsion.

8. The method of claim 7, wherein the chemical sensitizer is selected from $Na_2SO_3$, thiourea, $HAuCl_4$, AuCNS, $SnCl_2$, dioxide of thiourea, borohydride and mixtures thereof.

9. The method of claim 1, additionally comprising the step of adding a spectral sensitizer to the layer before exposing said layer to light, said spectral sensitizer being selected from the group of sensitizers having the structure:

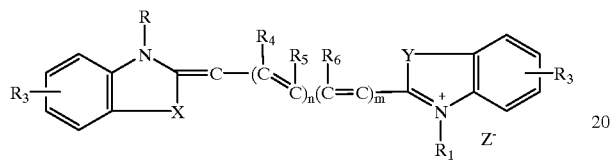

wherein for benzothiazole derivatives (X,Y=S); benzoxazole derivative (X,Y=O); benzimidazole derivative (X,Y=NR); quinoline derivative (XY=—CH=CH—); and indolenine derivative (X,Y=C($R_2$)) for the non-symmetrical dyes X does not equal Y (X≠Y), for example, X=O, and Y=S and are independently selected; wherein, for each derivative $R_2$ and $R_3$ are independently selected from H, $CH_3$, —$OCH_3$, —$SCH_3$, —N($CH_3$), —N(Et)$_2$, —N(propyl)$_2$, —N(iso-propyl)$_2$, —N(butyl)$_2$, —N(iso-butyl)$_2$, —N(sec-butyl)$_2$, —NCO($CH_2$)$_k$H wherein k is 1 to 5, F, Cl, Br, I, —CN, —$CO_2$H, —$CO_2$($CH_2$)$_j$$CH_3$ where j is 0 to 4, —$CONH_2$, —$CF_3$, $SOCF_3$, $SO_2CF_3$, —$C_6H_5$, and benzyl;

n is 0, 1 or 2and m is 0 or 1;

when n is 0 and m is 1 then $R_6$ is independently selected from H, $CH_3$, $C_2H_5$, $C_6H_5$, —$NH_2$, —$NHCOCH_3$, —$OCH_3$, and $CO_2CH_3$;

when n is 1 and m is 1 then $R_4$ and $R_6$ are H and $R_5$ H, $CH_3$, $C_2H_5$, and $NHCOCH_3$;

when $R_4$ and $R_6$ are linked together and $R_4$ and $R_6$ are —($CH_2$)$_2$—, —($CH_2$)$_3$—, or —$CH_2$C($CH_3$)$_2$$CH_2$— then $R_5$ is H, Cl, or $C_6H_5$;

when n is 2 and m is 1 then $R_4$, $R_5$ and $R_6$ are H or $R_4$ and $R_6$ are H and $R_5$ and $R_5$ is linked together then $R_5$ is —($CH_2$)$_3$—, —$CH_2$C($CH_3$)$_2$$CH_2$—;

and when R and $R_1$ are independently selected from alkyl then $Z^-$ is an anion and when R and $R_1$ are independently selected from —($CH_2$)$_3$$SO_3^-$ then $Z^+$ is a cation and mixtures thereof.

10. A digital optical memory device comprising:

(a) a luminescent material for an optical digital memory device comprising a substrate, insoluble microparticles dispersed in a water soluble polymer, said microparticles having a particle size less than about 0.2 microns, said microparticle, having a sorbed luminescent dye wherein said water soluble polymer and dispersed microparticles are applied to the substrate, said insoluble microparticles comprising silver microparticles and insoluble metal salts, said silver microparticles being a product of oxidation of silver by an oxidizer selected from the group consisting of $K_3$[Fe(CN)$_6$], $(NH_4)_2S_2O_8$, $KMnO_4$, $CuCl_2$, $FeCl_3$ and quinones, and said oxidation being carried out in a presence of anions selected from the group consisting of $SCN^-$, $CN^-$, $Cr_2O_7^{2-}$, $WO_4^{2-}$, $[Fe(CN)_6]^{3-}$, oxalate, citrate and anions of 1-phenyl-5mercaptotetrazole, 2-mercapto-benzothiazole, 2-mercaptobenzoxazole, 2-mercaptobenzimiduzole and organic mercapto compounds wherein said memory device has only one layer of said water soluble polymer and dispersed microparticles; and (b) two laser means for writing data in digital form on said material.

11. The memory device of claim 10, wherein the means for writing comprises a two-laser system for two-photon writing.

12. The memory device of claim 11, wherein the two-laser system comprises means for two-photon writing of the data in a three-dimensional optical matrix in said material.

13. The digital optical memory device of claim 10, wherein the luminescent dye is selected from the group consisting of:

the xanthene dyes selected from the group consisting of eosins, fluoresceins, erythrosins, and dichlorofluorescein of the following structure:

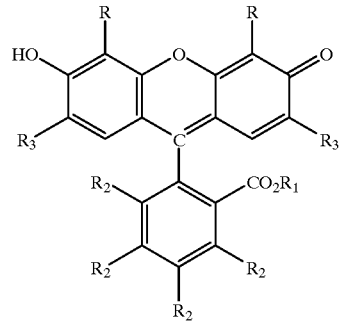

wherein R is independently selected from the group consisting of H, Cl, Br, I, $NO_2$, and alkyl; $R_1$ is H, Na, K, or Alkyl; $R_2$ is independently selected from the group consisting of H, Cl, $NH_2$, Br, I, isocyanate, isothiocyanate, and alkyl; and $R_3$ is independently selected from the group consisting of H, Cl, Br, I, $NO_2$, $NH_2$, and alkyl;

the xanthene dyes including the rhodamines B, 3B, C, G, 6G, 101, 123 having the following structure:

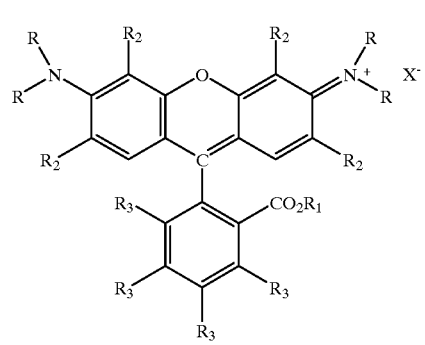

wherein R is H, $CH_3$, $C_2H_5$, $CH_2COOH$, or $C_2H_4OH$; $R_1$ is H, Na, K, $CH_3$, $C_2H_5$, Ar, or alkyl; $R_2$ is independently selected from the group consisting of H, Cl, Br, I, $NO_2$, and alkyl; $R_3$ is independently selected from H, Cl, Br, I, $NO_2$, isothiocyanate, isocyanate, and amines and X is an anion selected from $Cl^-$, $Br^-$, $I^-$, and $ClO_4^-$;

the acridine dyes selected from the group consisting of aurazine, trypaflovine, ethoxydiaminoacridine lactate and dyes having the following structure:

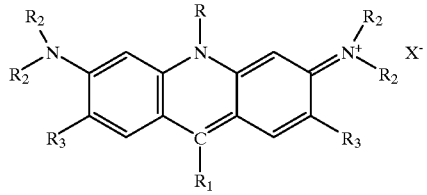

wherein R is H, CH$_3$, or C$_2$H$_5$; R$_1$ is independently selected from H, C$_6$H$_5$, and CO$_2$H; R$_2$ is independently selected from H, CH$_2$CH$_2$OH, and alkyl; R$_3$ is independently selected from H, CH$_3$, and alkyl; and X is a anion of F, Cl, Br, I, HCOO$^-$, CH$_3$CHOHCOO$^-$, or ClO$_4^-$;

the oxazine dyes selected from the group consisting of the oxazines 1, 4, 9, 17, 118, nile blue, capry blue A and dyes having the general structures:

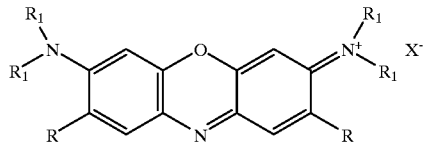

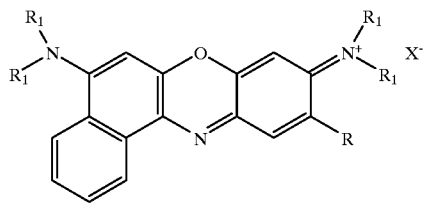

where R is selected from H, and CH$_3$; R$_1$ is independently selected from H, CH$_3$, CH$_3$CH$_2$ and alkyl and X is an anion selected from F, Cl, Br, I, ClO$_4^-$, sulfates, and phosphates;

the azine dyes selected from the group consisting of magdala red, lactoflavine, and dyes having the following structure:

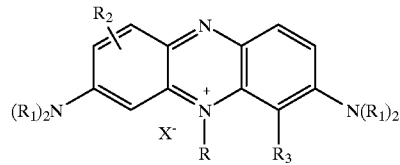

wherein R is phenyl, or naphthyl; R$_1$ is H, alkyl, or C$_6$H$_5$; R$_2$ is H, alkyl, benzyl, or O-benzyl; R$_3$ is H, or SO$_3$H, and X is an anion;

the indigo dyes, in the form of indigozoles, having the following structure:

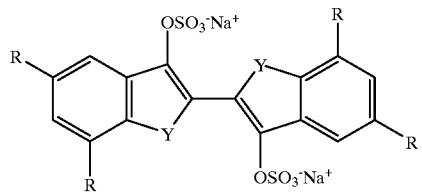

wherein, Y is NH, or S and R is independently selected from H, Cl, Br, O-alkyl, NO$_2$, sulfate, and alkyl;

the polycyclic vat dyes selected from the group consisting of aminoanthropyrimidines, anthropyridones, oxa- and tiadiazoloaminoantroquinones, and dyes from the group of benzanthrones in the form of sulfuric esters of leuco compounds having the following structures:

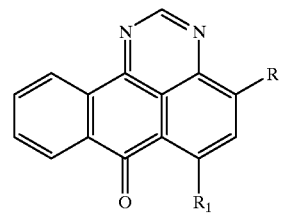

where R is H, or NH—C$_6$H$_5$; R$_1$ is H, or NHCOAr,

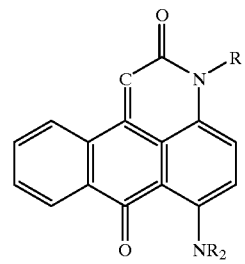

where R is H, alkyl, or aromatic,

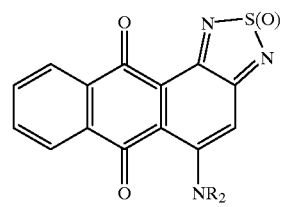

where R is H, C$_6$H$_{11}$, C$_2$H$_5$, or C$_2$H$_4$OH,

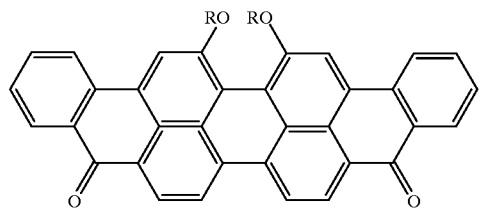

where R is H, Ar, or —SO$_2$Ar,

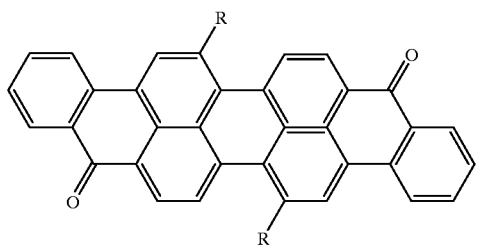

where R is independently selected from H, Cl, Br, OH, and the structure:

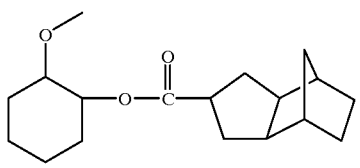

and dyes which are forming both the luminescent and non-luminescent complexes with polyvalent metal ions, selected from the hydroxyantraquinone derivatives: calcein, calcein blue, xanthocomplexan, methylcalcein, methylcalcein blue as shown in the following structures:

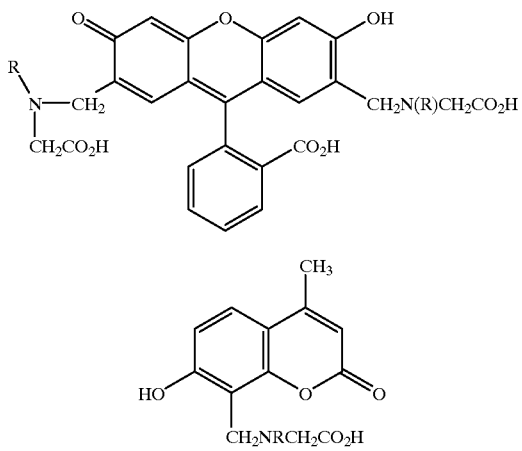

Where R is CH$_3$, or CH$_2$COOH,

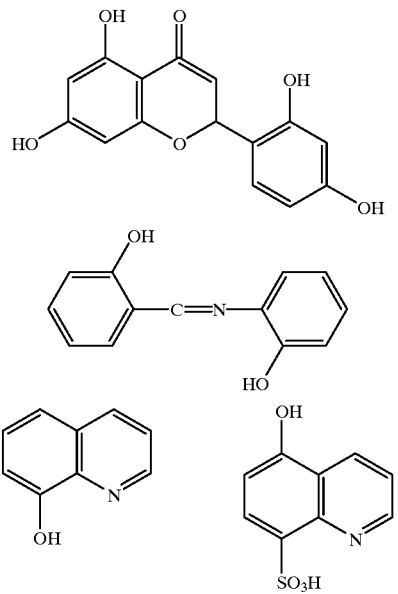

and the cyanine dyes of the following structure:

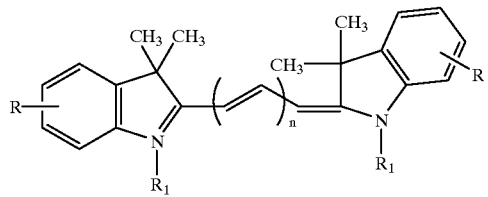

wherein n is 1,2,3; R is H, or SO$_3$H; R$_1$ is alkyl, or (CH$_2$)$_m$SO$_3$H, m is 3,4 or 5 and X$^-$ is an anion.

14. The device of claim 10, wherein the microcrystals are about 0.02 to 0.08 microns.

15. The method of claim 10, wherein the water soluble polymer is selected from the group consisting of polyvinyl alcohol, polyvinyl pyrrolidone, gelatine, gelatine modified with polyvinyl alcohol, polyvinyl pyrrolidone, polyvinyl sulphate, carboxymethylcellulose, cellulose acetophthalate, phthaloylgelatine or graft polymers of gelatine with polymethoxydiethyleneglycol acrylate, polydiacetoneacrylamide or poly-N,N'-metylenediacrylamide, and mixtures thereof.

* * * * *

UNITED STATES PATENT AND TRADEMARK OFFICE
CERTIFICATE OF CORRECTION

PATENT NO. : 6,265,140 B1 Page 1 of 1
APPLICATION NO. : 09/028932
DATED : July 24, 2001
INVENTOR(S) : Levich et al.

It is certified that error appears in the above-identified patent and that said Letters Patent is hereby corrected as shown below:

Column 20:
Line 64 (claim 6, line 1), before "of claim 5," delete "device" and insert -- method --.

Column 26:
Line 42 (claim 15, line 1), before "of claim 10," delete "method" and insert -- device --.

Signed and Sealed this

Seventeenth Day of April, 2007

JON W. DUDAS
*Director of the United States Patent and Trademark Office*